United States Patent [19]

Erickson

[11] 4,120,389
[45] Oct. 17, 1978

[54] PROXIMITY SENSOR

[75] Inventor: Clifford W. Erickson, Minnetonka, Minn.

[73] Assignee: Honeywell Inc., Minneapolis, Minn.

[21] Appl. No.: 721,147

[22] Filed: Sep. 7, 1976

Related U.S. Application Data

[62] Division of Ser. No. 534,997, Dec. 20, 1974, abandoned.

[51] Int. Cl.² ............................................. H04B 9/00
[52] U.S. Cl. ................................ 192/129 A; 192/130; 340/15; 343/5 PD
[58] Field of Search ............... 192/129 A, 130, 131 R, 192/134; 343/5 PD; 340/15, 16 R, 258 B; 181/160, 175, 176

[56] References Cited

U.S. PATENT DOCUMENTS

| | | | |
|---|---|---|---|
| 3,406,802 | 10/1968 | Needham et al. | 192/130 |
| 3,854,327 | 12/1974 | Felix | 73/69 |
| 3,876,969 | 4/1975 | Price, Jr. | 192/130 X |
| 3,896,425 | 7/1975 | Erichsen | 340/358 B |

FOREIGN PATENT DOCUMENTS

554,892  3/1958  Canada ................................. 192/130

*Primary Examiner*—William F. O'Dea
*Assistant Examiner*—Harold Joyce
*Attorney, Agent, or Firm*—Omund R. Dahle

[57] ABSTRACT

An energy curtain is formed by exciting high order beam modes in an open resonant cavity. Depending on mode number, the energy resonates in a mathematically determined pattern. A detector senses changes in the resonant condition caused by the presence of an object in the pattern. The apparatus may be used in a variety of applications, including the protection of a machine operator from a hazardous area of a machine, parts counting, and intrusion detection.

9 Claims, 11 Drawing Figures

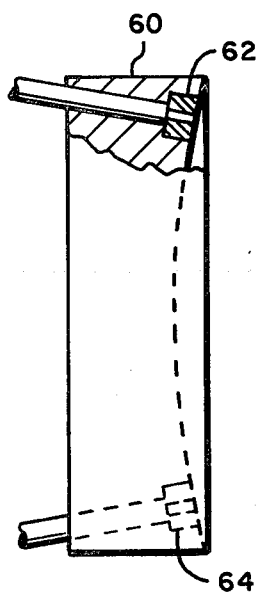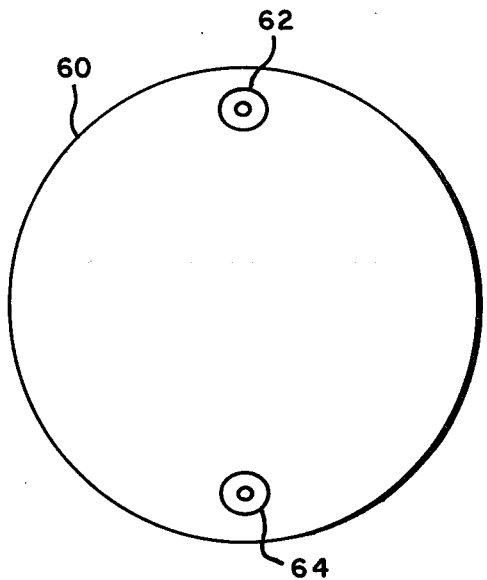
FIG. 5b  FIG. 5a
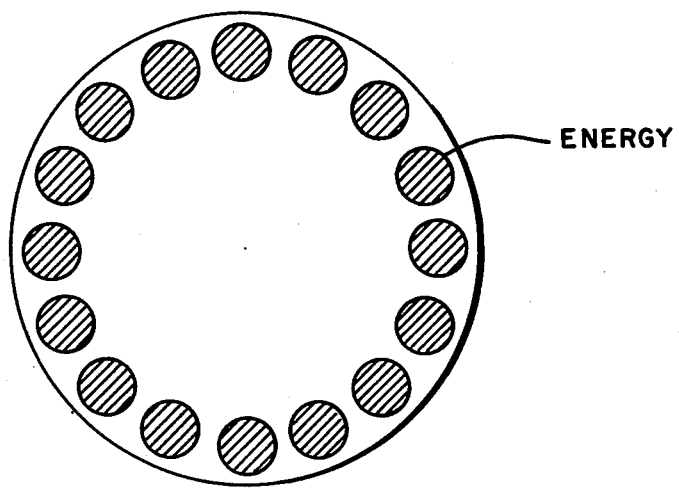
FIG. 6

PROXIMITY SENSOR

This is a division, of application Ser. No. 534,997, filed Dec. 20, 1974, abandoned.

CROSS-REFERENCE TO CO-PENDING APPLICATIONS

Reference is made to my two co-pending applications, entitled "High Order Beam Mode Resonator" now U.S. Pat. No. 3,979,695 and "Acoustic Resonant Cavity" now U.S. Pat. No. 3,948,350, which were filed on even data with this application, and which are assigned to the same assignee as this application.

BACKGROUND OF THE INVENTION

The present invention relates to a proximity sensor, which is a device which reacts to the presence of an object within a certain spatial volume, without direct physical contact between the proximity sensor and the object. The basic components of the proximity sensor are an energy source and a sensor. Interaction between the object and the energy causes a change in some aspect of the sensor output (amplitude, frequency, etc.) from which the presence of the object is inferred.

Among the applications for a proximity sensor are the fields of instrusion detection, the counting of parts produced by a production tool, and the protection of a machine operator from the hazardous area of a machine. Increasingly severe requirements, due to expanding technology and more alien environments, have necessitated research to improve performance parameters of present proximity sensors, as well as the development of new approaches.

An area of particular recent concern has been the need for a device as a guard or shutoff control for machine tools. The purpose of the device would be to deactuate a machine should the operator insert his hands into an area which is dangerous. For example, such an apparatus is needed for a punch, forging, or stamping press where it is desirable to cause the press to shut down at once and discontinue operation should the operator's hands be in the press area during operation.

A number of safety devices for machine tools have been proposed recently. Among the types of safety devices proposed are the light curtain type, the capacitance type, and the physical barrier type.

The light curtain type of safety device utilizes a light beam or beams which form a curtain of light. This may be achieved by the sequential operation of a plurality of light sources, as shown in U.S. Pat. No. 3,746,863, or by the scanning of a single light beam and the reflection of the scanned beam between a pair of spaced reflectors. When the light beam is interrupted so that it does not reach a detector, the machine tool is deactuated. One problem with these systems is that they are relatively complex. In the case of the light curtain of U.S. Pat. No. 3,746,863, a large number of light sources and detectors are required as well as circuitry for the sequential operation of these sources and detectors. In the case of the scanning light beam, only a single light source and detector are used, but moving parts, including a scanning mirror, are required.

The capacitance type of safety device uses an antenna near the dangerous area. The presence of an object near the antenna causes a change of the loading on the antenna which is then sensed. One problem with this type of sensor is that it will sense movement three feet or more away from the antenna, i.e. the space which it monitors is not well defined.

The physical barrier type of safety device utilizes a screen or plate which is interposed between the operator and the dangerous area. The machine will operate only when the plate is in position. In some applications, the operator must move the plate in order to load the machine and then replace the plate in order to start the machine. This causes additional operations to be performed by the operator, thereby reducing productivity. In other applications the physical barrier is moved automatically, but this is still a time consuming motion. In both cases the physical barrier obstructs the operator's view of the die.

SUMMARY OF THE INVENTION

The proximity sensor of the present invention utilizes energy which is resonating in a high order beam mode in a predetermined pattern. A change in the resonant condition caused by the presence of an object in the predetermined pattern is detected.

BRIEF DESCRIPTION OF THE DRAWING

FIGS. 5a and 5b show front and side views, respectively, of a circular reflector for producing cylindrical resonant modes for use in the present invention.

FIG. 6 shows the energy distribution of a resonant cylindrical $TEM_{08}$ mode.

DETAILED DESCRIPTION OF THE PREFERRED EMBODIMENTS

The present invention is a proximity sensor which utilizes perturbation of a resonant beam mode as the sensing mechanism. The beam mode resonator is chosen to resonate in a mode whose geometry coincides with a desired shape of an energy curtain. The presence of an object is inferred from its perturbing effects on resonant parameters of the cavity.

Beam modes are so named because they are mathematically identical to the possible cross-sectional power levels of a laser beam. (H. Kogelnik and T. Li, "Laser Beams and Resonators," Applied Optics, 5, 1550–1567 (October, 1966)), or the so-called beam wave guide. (G. Gouban and F. Schwering, "On the Guided Propagation of Electro-magnetic Wave Beams," IRE Trans. on Antennas and Propagation, AP-9, 248–256 (May, 1961)). In these well-known technologies, however, the goal is to suppress high order modes, since they have a greater spatial extent and hence greater loss. Although observation of modes as high as $TEM_{07}$ have been reported in the laser literature, they are not usually welcome in laser or beam wave-guide technology. In the applications of this invention, however, it is precisely the greater spatial extent of the higher order modes which is exploited. Indeed, in the cylindrical annular case, modes as high as TEM$_{0-25}$ have been used at a wavelength of 3 cm. For shorter wavelengths even higher order modes are used.

Figure 1:
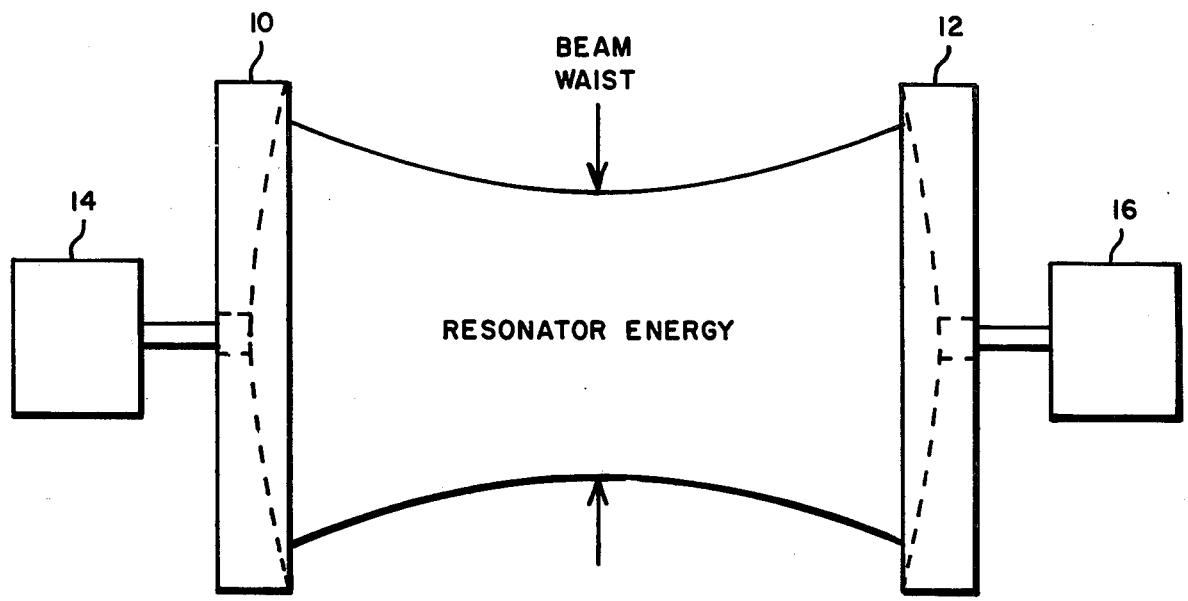
FIG. 1 shows a reasonant cavity of the type used in the present invention.

FIG. 1 shows a diagramatic representation of the present invention. The resonant cavity is formed by reflectors 10 and 12 which are two concave curved surfaces facing one another and separated from one another along an axis. Energy source 14 provides energy into the cavity formed by reflectors 10 and 12. As shown in FIG. 1, the energy may be supplied to the resonant cavity through a hole in one of the reflectors. Detector 16 senses the energy in the resonant cavity.

The spacing and shape of reflectors 10 and 12 and the wavelength of the energy supplied by energy source 14 will determine the particular spatial distribution of the resonant energy in the resonant cavity. The intrusion of a foreign object, such as a machine operator's hand, into a resonant cavity destroys the resonance because the foreign object absorbs energy, scatters energy out of the resonant cavity, and causes a shift in the resonant frequency. This disturbance in the resonance is sensed by detector 16, which can be used to shut off a machine, to sound an alarm, or for a variety of other purposes.

Many design alternatives are available for the present invention. For example, both electromagnetic energy (in the microwave region of the spectrum) and acoustic energy have been used in the present invention. The preferred wavelength of the energy is between about 0.1 mm and about 10 cm. Acoustic energy has one important advantage over electromagnetic energy. A given wavelength can be produced with acoustic waves at a much lower frequency than with microwaves, due to the lower speed of propagation of acoustic waves. The production of resonant beam modes with acoustic waves is described in my previously mentioned patent application entitled "Acoustic Resonant Cavity".

As shown in FIG. 1, the reflectors 10 and 12 have curved surfaces. Although plane reflectors can also be used, experiments have shown that reflector alignment becomes very critical, which is a disadvantage for most applications. When spherical surfaces are used, alignment is considerably less critical. The preferred surfaces for reflectors 10 and 12, therefore, are curved. The most preferred surface shape is a spherical surface.

It is known from laser and beam wave-guide technology that the axial spacing of two reflectors can be as large as, but not greater than, twice the radius of curvature of the reflectors and stable resonance will still be achieved. However, it has been found that the beam waist as shown in FIG. 1 becomes very narrow at larger spacings, thereby rendering a portion of the volume between reflectors insensitive to intrusion. In order to insure that essentially the entire volume between reflectors is sensitive to intrusion the preferred ratio R/d of the radius of curvature R and the spacing d is between about 1.5 and about 2.0. Although R/d can range from 0.5 to infinity, less than about 1.5 causes the beam waist to be narrow, and greater than about 2.0 results in a very close spacing of the reflectors.

In general, a resonant cavity resonates in many modes. Each mode is characterized by a certain geometric distribution of energy and a certain resonant frequency, the so-called eigenfunction and eigenvalue, respectively, which comprise a possible solution to the wave equation. In principle, any arbitrary distribution of energy is possible by combining the individual modes in a suitable way. In practice, however, it is difficult to excite the cavity with just the right amount of each mode. For that reason, the preferred embodiments of the present invention utilize a single mode of resonance which has the desired geometrical shape.

Figure 2B:
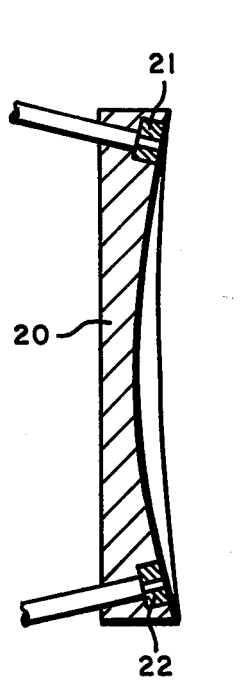
FIGS. 2a and 2b show a front and a cross-sectional side view, respectively, of a rectangular reflector for use in one embodiment of the present invention.
Figure 2A:
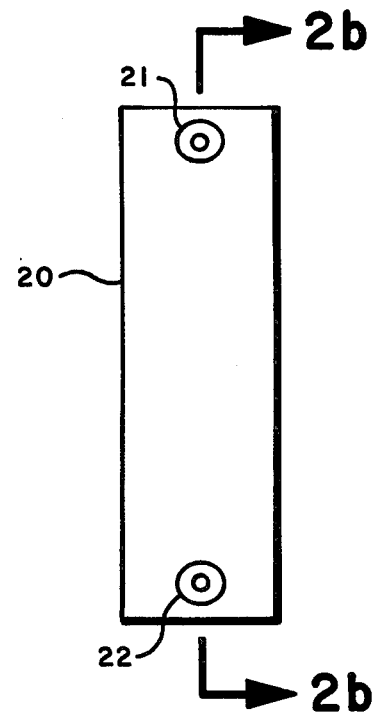

FIGS. 2a and 2b show front and cross-sectional side views of rectangular shaped reflectors which can be used to produce an essentially planar pattern of resonant energy. Rectangular reflector 20 includes input coupling iris 21 and output coupling iris 22. Energy from the energy source enters the resonant cavity through input coupling iris 21. Output coupling iris 22, which alternatively may be in the other rectangular reflector, allows energy to pass from the resonant cavity to the detector.

When electromagnetic energy is used, the mode generated in the resonant cavity is termed the transverse electromagnetic TEM$_{qmn}$ mode, where $q, m, n$ are integers denoting the number of intensity minima in the axial and two transverse directions, respectively. Of course, acoustic waves are longitudinal, not transverse; however, they obey the same differential equation and, in this case, satisfy the same boundary condition, so that the mathematical form of the acoustic solution is identical to that of the electromagnetic one. Therefore, the same TEM$_{qmn}$ designation is used for the acoustic solution, it being understood that this is not a description of the physical nature of the wave.

When the reflectors are rectangular, the distribution of energy in the midplane of the cavity is approximately, $$[H_n(x\sqrt{2}/w)]^2 (w_0/w)^2 [H_n(y\sqrt{2}/w)]^2 e^{-2(x^2+y^2)/w^2} \quad \text{Equation 1}$$

where $x$ and $y$ are rectangular coordinates, $w$ is a length parameter depending on reflector geometry and the axial distance between the reflectors, $w_0$ is the value of $w$ at the beam waist and $H_n$ and $H_m$ are Hermite polynomials of order $m$ and $n$ respectively The integers $m$ and $n$ determine the particular mode, which is denoted as TEM$_{mn}$.

One particularly useful mode is the rectangular TEM$_{m0}$ mode. This mode can result in a planar distribution of resonant energy. Equation 1 can be simplified when $n = 0$ since $H_0 = 1$. The resulting energy distribution is described as $$(w_0/w)^2 [H_m(x\sqrt{2}/w)]^2 e^{-2(x^2+y^2)/w^2} \quad \text{Equation 2}$$

Figures 3A, 3B:
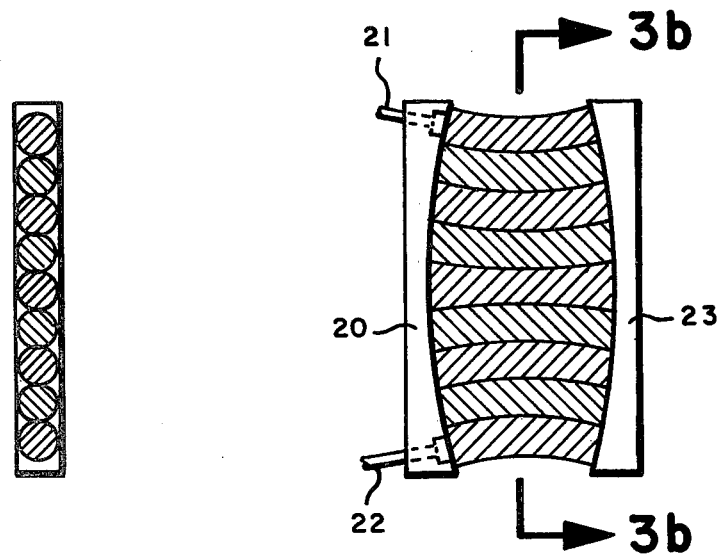
FIGS. 3a and 3b shows the energy distribution of a resonant rectangular $TEM_{80}$ mode formed with rectangular reflectors of the type shown in FIGS. 2a and 2b.

FIG. 3a shows the distribution of energy in a resonant cavity formed by rectangular reflectors 20 and 23 for the rectangular TEM$_{80}$ mode. FIG. 3b shows the energy distribution at the beam waist. It can be seen that this energy distribution forms essentially a planar curtain of resonant energy. The curtain is formed by a plurality of energy "bundles" which are arranged side by side. The number of energy bundles equals $m+1$. In most applications, it is desirable to make $m$ as large as possible. The term "planar" is used throughout to described an energy curtain which, in its narrow dimension, is one "bundle" thick. This is approximately equal to $\sqrt{\lambda d}$, where $\lambda$ is the wavelength and $d$ the reflector spacing.

Figure 4A:
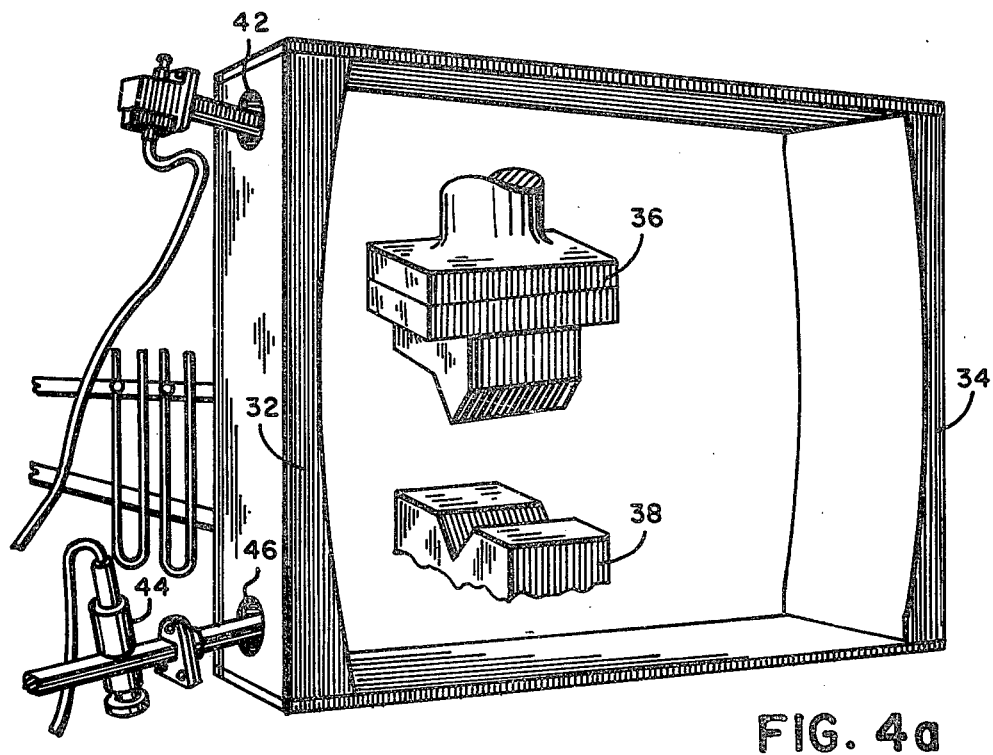
FIGS. 4a and 4b show the apparatus of the present invention used as a device for machine operator safety.
Figure 4B:
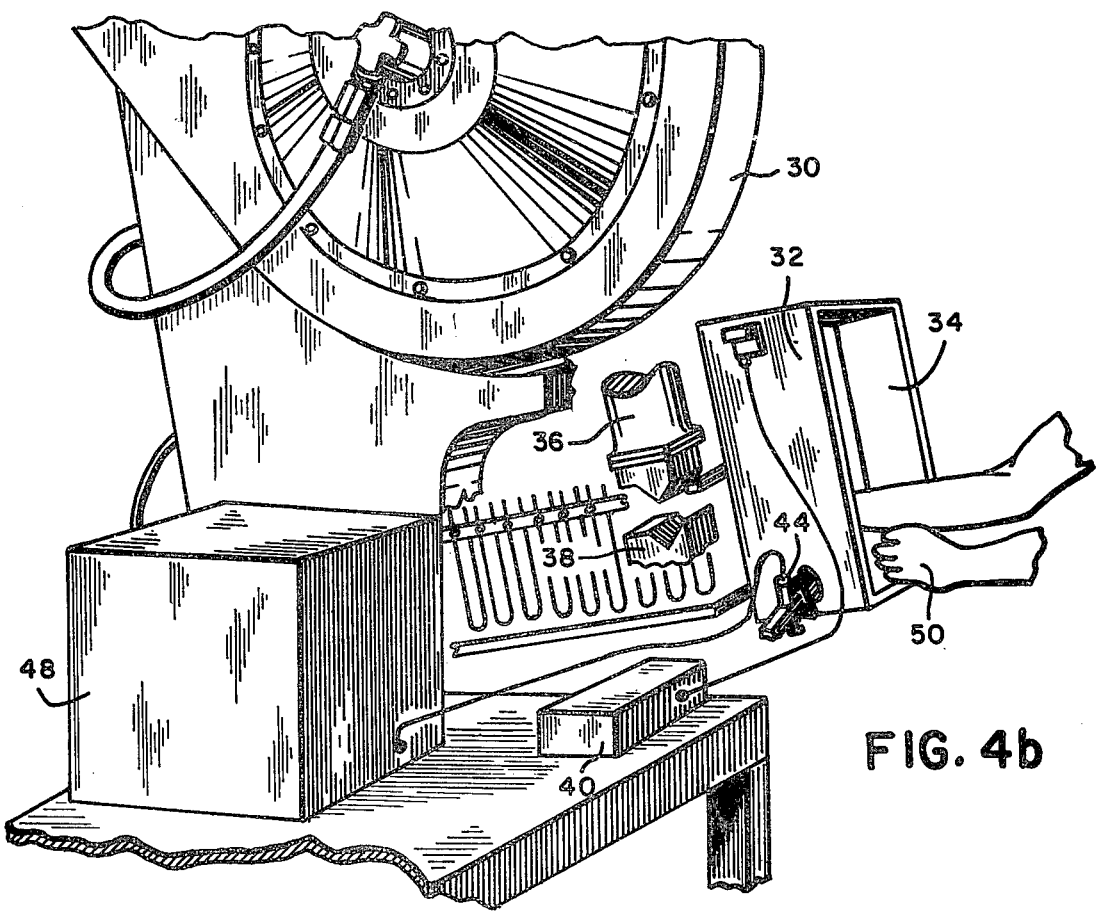

FIGS. 4a and 4b show a punch press 30 including machine operator safety apparatus of the present invention. A resonant cavity formed by rectangular reflectors 32 and 34 is mounted between the operator and the hazardous area (ram 36 and die 38) of punch press 30. Other means of ingress to the hazardous area have been blocked off so that the operator must insert his hand in and through the resonant cavity in order to get to the hazardous area of the punch press 30.

Rectangular reflectors 32 and 34 are generally similar to reflectors 20 and 23 shown in FIG. 3. Energy from energy source 40 is coupled into the resonant cavity through input coupling iris 42 in reflector 32. Energy is coupled out of the resonant cavity to detector 44 through output coupling iris 46 in reflector 32. The output of detector 44 is directed to machine control 48, which controls the operation of punch press 30.

A planar distribution of resonant energy is produced in the resonant cavity. In one successful embodiment, the energy was electromagnetic energy produced by a microwave source. The particular resonant mode utilized was the rectangular $TEM_{mo}$ mode, where $m = 10$. In this embodiment, detector 44 was a microwave detector.

In operation, punch press 30 operates as normal as long as the resonant condition is present in the resonant cavity. Any disturbance in the resonant condition is sensed by detector 44. Control means 48 stops punch press 30 whenever detector 44 senses a disturbance in the resonant condition. For example, whenever a machine operator attempts to reach into the hazardous area of punch press 30, his hand 50 destroys the resonance in the resonant cavity. This is sensed by detector 44 and control means 48 turns the punch press 30 off. As soon as the operator's hand 50 is removed from the resonant cavity and resonance is again established, detector 44 senses the resonant energy and machine control 48 starts punch press 30. Manual reset is also possible, and in some cases is preferable.

The system shown in FIGS. 4a and 4b has several advantages. First, it requires relatively few parts. Second, the apparatus requires no moving parts. Third, the energy used for the proximity sensing is confined to the specific spatial distribution of the beam within the resonant cavity. Movement outside of the resonant cavity by either the machine operator or the machine does not disturb resonance and does not, therefore, cause the machine to be stopped. Fourth, machine control 48 allows the machine to operate only when detector 44 indicates that energy is resonating in the cavity. If the safety apparatus is in some way disabled, machine control 48 will not allow the machine to operate. Failure of either energy source 40 or detector 44, or failure to establish resonance because of some change in the resonant cavity, causes the machine to remain shut down until the safety apparatus is repaired.

A second resonant energy distribution which has several useful applications is a cylindrical annular distribution. This distribution is produced by circular reflectors. FIGS. 5a and 5b show front and side views of a circular reflector which can be used to generate cylindrical annular resonant modes. Reflector 60 is circular with an essentially spherical surface. Input iris 62 couples energy into the resonant cavity, and output iris 64 couples energy from the cavity to a detector.

It should be noted that input iris 62 is not located at the center of reflector 60, but rather is located near the periphery. The energy will be introduced into the resonant cavity, therefore, at a location not on the axis defined by a line connecting the centers of curvature of the two reflectors. It has been found that to generate a cylindrical annular distribution of energy, in which the resonant energy is at a maximum near the periphery of the reflectors and at a minimum (essentially zero) on the axis, the energy must be introduced off axis. Further description of "off-axis" excitation of high order beam modes is contained in my previously mentioned copending patent application entitled "High Order Beam Mode Resonator".

When the reflectors of the resonant cavity are circular, the distribution of energy between the reflectors can be expressed approximately as $$(w_o/w)^2 (2r^2/w^2)^l [L_p^l(2r^2/w^2)]^2 [e^{-2r^2/w^2}] \cos^2 l\phi \qquad \text{Equation 3}$$

where $r$ is the radius, $\phi$ is the azimutual angle of the cylindrical coordinate system, and $w$ is a length parameter depending on the mirror geometry and axial position between the mirrors. The integers $p$ and $l$ determine the particular mode, which is denoted as $TEM_pl$. $L_p^l$ is the generalized Laguerre polynomial.

In the case of a cylindrical annular resonant mode, $p$ is zero. In this case, Equation 3 is simplified, since $L_o^l = 1$. Equation 3 then becomes $$(2r^2/w^2)^l [e^{<2r^2/w^2}] \cos^2 l\phi \, (w_o/w)^2 \qquad \text{Equation 4}$$

FIG. 6 shows the energy distribution at the beam waist for the cylindrical $TEM_{08}$ mode. The energy is distributed in $2l$ energy bundles over an annulus whose radius is $w(\sqrt{l/2})$. It is advantageous, therefore, to make $l$ as large as possible. Cylindrical annular modes having $l$ as high as 25 have been successfully produced.

Since the energy in the cylindrical annular mode is confined to an annulus, the entire center portion of the reflector can be removed without affecting the resonance. A machine tool can be located along the resonator axis without disturbing the resonant condition.

Figure 7:
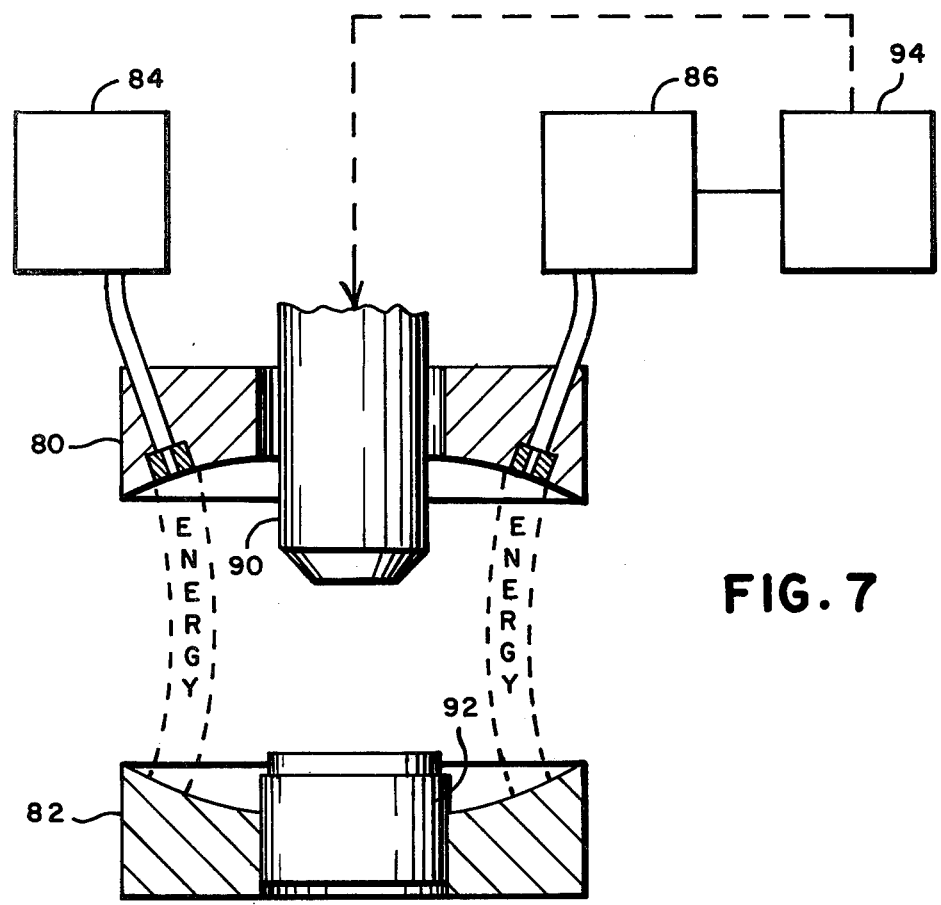
FIG. 7 shows a partial cross-sectional view of machine operator safety apparatus utilizing a cylindrical resonant mode.

FIG. 7 shows a partial cross-sectional view of such an embodiment. A resonant cavity is formed by circular reflectors 80 and 82. Energy source 84 provides energy to the resonant cavity. This energy is introduced off axis to generate a cylindrical annular resonant mode. Detector 86 senses the energy in the resonant cavity.

The reflectors 80 and 82 have their center portions removed so that a ram 90 and die 92 may be located along the axis of the resonant cavity. Since the energy is confined to an annulus surrounding the ram 90 and die 92, the machine operator cannot insert his hands into the dangerous area without disturbing the resonant energy. Machine control 94 controls the punch as a function of the signal from detector 86. Whenever resonance is disturbed, punch 90 is stopped by machine control 94.

The present invention, although particularly advantageous for machine operator safety, can be used in any application where it is desired to sense the ingress to or egress from a particular area. A resonant cavity is used to confine the beam energy in a resonant condition to a location of ingress to or egress from the particular area. Any change in the resonant condition will indicate that some object is entering or leaving the protected area. The particular resonant mode selected will depend upon the nature and shape of the area to be protected.

Among the applications for the present application in addition to machine operator safety systems is for use as intrusion detectors and parts counters. In the intrusion detector application, any object which passes through the resonant cavity on its way to the protected area will destroy resonance. This change in the resonant condition can be detected and the signal from the detector can be used to sound an alarm or other form of warning device.

The present invention also may be used as a parts counter where parts are being ejected from an automatic machine tool. The resonant cavity is located so that the ejected parts have to pass through the resonant cavity. Each time a part is ejected, it causes a disturbance in the resonant condition which is detected. The signal from the detector is then directed to a counting device which counts the number of times that the resonant condition is disturbed. This total corresponds to the number of parts which have been ejected. Such a device also verifies that the part has ejected from the die, thereby allowing the press to cycle again.

In conclusion, the present invention is a proximity sensor having a wide variety of applications. It has a minimum number of parts and no moving parts. A variety of resonant modes having different spatial distributions may be used depending upon the particular application desired.

The present invention has been described with reference to a series of preferred embodiments. It will be understood, however, by workers skilled in the art that changes in form and detail may be made without departing from the spirit and scope of the invention.

The embodiments of the invention in which an exclusive property or right is claimed are defined as follows:

1. Apparatus for protecting a machine operator from a hazardous area of a machine, the apparatus comprising:
    means for generating a spatial distribution of resonant energy interposed between the operator and the hazardous area wherein the means for generating a spatial distribution of resonant energy comprises,
    beam resonant cavity means wherein the resonant beam cavity means comprises concave curved surfaces facing one another and separated from one another along an axis, and
    energy source means for introducing energy into the beam resonant cavity means, the energy being resonant in a mathematically describable spatial distribution wherein the energy source means introduces energy into the resonant cavity means at a position not on the axis;
    detector means for sensing energy within the spatial distribution; and
    control means for controlling the machine in response to the detector means.

2. The apparatus of claim 1 wherein the concave curved surfaces have substantially spherical surfaces.

3. The apparatus of claim 1 wherein the ratio of the radius of curvature of the reflectors to the axial spacing of the reflectors is between 1.5 and 2.0.

4. The apparatus of claim 1 wherein the spatial distribution of resonant energy is a substantially cylindrical annular distribution.

5. The apparatus of claim 1 wherein the spatial distribution of resonant energy is a substantially planar distribution.

6. The apparatus of claim 1 wherein the resonant energy is electromagnetic energy.

7. The apparatus of claim 1 wherein the resonant energy is acoustic energy.

8. The apparatus of claim 1 wherein the presence of an object in the spatial distribution of resonant energy causes a disturbance in the spatial distribution.

9. The apparatus of claim 8 wherein the control means causes the machine to cease operation when a disturbance in the spatial distribution occurs.

* * * * *